US012695251B2

(12) United States Patent
Seibuchner

(10) Patent No.: US 12,695,251 B2
(45) Date of Patent: Jul. 28, 2026

(54) PLUG OR SOCKET AS A COMPONENT FOR AN ELECTRICAL CONNECTOR

(71) Applicant: ODU GmbH & Co. KG, Mühldorf a. Inn (DE)

(72) Inventor: Stefan Seibuchner, Mühldorf a. Inn (DE)

(73) Assignee: ODU GmbH & Co. KG, Mühldorf a. Inn (DE)

( * ) Notice: Subject to any disclaimer, the term of this patent is extended or adjusted under 35 U.S.C. 154(b) by 999 days.

(21) Appl. No.: 17/887,437

(22) Filed: Aug. 13, 2022

(65) Prior Publication Data

US 2023/0059712 A1 Feb. 23, 2023

(30) Foreign Application Priority Data

Aug. 17, 2021 (EP) .................................... 21191664

(51) Int. Cl.

| | |
|---|---|
| ***H01R 13/6585*** | (2011.01) |
| ***H01R 13/6461*** | (2011.01) |
| ***H01R 24/20*** | (2011.01) |
| ***H01R 24/28*** | (2011.01) |
| *H01R 107/00* | (2006.01) |

(52) U.S. Cl.

CPC ..... *H01R 13/6585* (2013.01); *H01R 13/6461* (2013.01); *H01R 24/20* (2013.01); *H01R 24/28* (2013.01); *H01R 2107/00* (2013.01)

(58) Field of Classification Search

CPC ............................ H01R 13/5812; H01R 13/42

See application file for complete search history.

(56) References Cited

U.S. PATENT DOCUMENTS

| | | | | |
|---|---|---|---|---|
| 5,018,985 | A | 5/1991 | Moore | |
| 5,266,047 | A | 11/1993 | Black et al. | |
| 5,304,964 | A | 4/1994 | DiMarco | |
| 6,113,426 | A | 9/2000 | Lin | |
| 6,494,743 | B1 * | 12/2002 | Lamatsch .......... | H01R 13/6586 439/607.05 |
| 7,195,518 | B2 * | 3/2007 | Bert ..................... | H01R 4/2441 439/607.43 |
| 7,255,602 | B1 | 8/2007 | Driessen et al. | |

(Continued)

FOREIGN PATENT DOCUMENTS

| | | | |
|---|---|---|---|
| CN | 102906832 | A | 1/2013 |
| CN | 104124575 | A | 10/2014 |

(Continued)

*Primary Examiner* — Neil Abrams

(74) *Attorney, Agent, or Firm* — Harris Beach Murtha Cullina PLLC; Laura W. Smalley

(57) ABSTRACT

A component for an electrical connector, comprising a housing and a plurality of electrical contact elements, the ends of which are accessible at one end of the housing for connection to a mating connector component. The electrical contact elements are arranged in at least two segments which are separated from and shielded against each other. The outer contour of each of the at least two segments has at least two legs and a base side extending from one end of one leg to one end of the other leg, at least one leg of each segment forming an interior angle of 300 to 800 or 100° to 150° with the base side. The segments are arranged in a row with a shielding being provided between the legs of neighbouring segments.

14 Claims, 6 Drawing Sheets

(56) References Cited

U.S. PATENT DOCUMENTS

| | | | | |
|---|---|---|---|---|
| 7,316,584 | B2 * | 1/2008 | Mackillop .......... | H01R 13/6477 439/607.05 |
| 7,572,148 | B1 * | 8/2009 | Pepe .................. | H01R 13/6589 439/607.05 |
| 8,218,309 | B2 | 7/2012 | Tan | |
| 9,070,998 | B2 * | 6/2015 | Phillips .............. | H01R 13/6474 |
| 9,270,054 | B2 * | 2/2016 | Beltzer .............. | H01R 13/6456 |
| 9,306,312 | B2 | 4/2016 | Dang | |
| 9,680,268 | B1 * | 6/2017 | Finona ................. | H01R 13/622 |
| 10,845,254 | B2 * | 11/2020 | Bacher ................... | G01K 7/023 |
| 11,177,615 | B2 * | 11/2021 | Ikehara .............. | H01R 13/6589 |
| 2001/0030855 | A1 | 10/2001 | Green et al. | |
| 2004/0058572 | A1 | 3/2004 | Fromm et al. | |
| 2006/0246780 | A1 | 11/2006 | Bert et al. | |
| 2006/0252312 | A1 | 11/2006 | Lalumandier et al. | |
| 2013/0016493 | A1 * | 1/2013 | Cook ...................... | H01R 27/02 439/502 |
| 2015/0270647 | A1 * | 9/2015 | Hoher ................ | H01R 13/6582 439/607.05 |
| 2016/0049747 | A1 * | 2/2016 | Yu ...................... | H01R 13/5219 439/271 |
| 2018/0166814 | A1 | 6/2018 | Chin | |
| 2018/0323549 | A1 * | 11/2018 | Vogel ................... | H01R 13/642 |

FOREIGN PATENT DOCUMENTS

| | | | |
|---|---|---|---|
| CN | 108010634 | A | 5/2018 |
| CN | 108574148 | A | 9/2018 |
| DE | 4311781 | C1 | 6/1994 |
| DE | 202015105928 | U1 | 12/2015 |
| EP | 2161795 | A2 | 3/2010 |
| JP | H05182711 | A | 7/1993 |
| JP | 2001102133 | A | 4/2001 |
| JP | 2002075552 | A | 3/2002 |
| JP | 2003132986 | A | 5/2003 |
| JP | 2011060425 | A | 3/2011 |
| JP | 2011243543 | A | 12/2011 |
| JP | 2013537693 | A | 10/2013 |
| RU | 2608593 | C2 | 1/2017 |
| WO | WO-0103247 | A1 | 1/2001 |

* cited by examiner

PLUG OR SOCKET AS A COMPONENT FOR AN ELECTRICAL CONNECTOR

CROSS-REFERENCE TO RELATED APPLICATIONS

This application claims priority to and the benefit of European patent application no. 21191664.8, filed on Aug. 21, 2021, which is incorporated herein by reference in its entirety.

DESCRIPTION

Field of the Invention

The invention relates to a component for an electrical connector, such as a plug or a socket. The invention also relates to an electrical connector.

BACKGROUND OF THE INVENTION

In many applications for the transmission of electrical signals, shielded cables are employed in order to avoid interference between the signal transmitted by a particular cable with external signals such as signals transmitted by other cables. In order to connect such cables in a way that leakage and interference is also avoided at the point of connection, shielded connectors are used. Several structural solutions are known in the prior art for realizing the separation of different electrical signals, data protocols or current-carrying conductors by means of shielding and for protecting them from mutual interference, e.g. crosstalk.

The document U.S. Pat. No. 5,304,964 A discloses a connector comprising a receptacle with rectangular cavities and standard plugs that are arranged in the cavities. The electrically conductive receptacle is grounded and includes a spacer between the two cavities such that the two plugs are shielded in view of electromagnetic interference and radio frequency interference against each other and against the environment. A similar connector is known from the Chinese patent application CN 104124575 A.

A different design of a connector is disclosed in U.S. Pat. No. 9,306,312 B2, which shows an electrical connector system including mating pin and socket connectors each designed for increased contact density to improve performance of high-speed data transfer. The connectors comprise an electrically conductive plug insert having a plurality of contact-receiving cavities extending in an axial direction through the plug insert, a plurality of electrically insulating sheaths, each sheath carrying a pair of electrical contacts in a spaced-apart relation, a plurality of electrically conductive shield ferrules and an electrically conductive shield housing with ferrule-receiving cavities extending in the axial direction through the shield housing. The connectors include features for retaining a plurality of pin or socket contacts in a ganged, co-aligned configuration and for shielding groups of contacts from one another to reduce interference and crosstalk. As an example a connector system with four groups of eight pins each are shown wherein the cavities and sheaths are circular.

Plug connectors available on the market that have more than one shielded segment of electrical contact elements are either of the rectangular type or the circular type as disclosed in the above-mentioned prior art documents. Even though known plug connectors are used in many different applications, there are limitations to their use. In particular, due to the connectors' structural design, they may be unsuitable in applications where the available installation space is limited.

OBJECT OF THE INVENTION

It is an object of the present invention to provide an improved component such as a plug or a socket for an electrical connector and a respective electrical connector that overcomes disadvantages of components known in the prior art. In particular, the invention seeks to provide a component for an electrical connector and an electrical connector that enables the transmission of several data protocols, electrical signals and/or energy in a single connector without disturbances in a compact design.

Solution According to the Invention

In the following, any reference to one (including the articles "a" and "the"), two or another number of objects is, provided nothing else is expressly mentioned, meant to be understood as not excluding the presence of further such objects in the invention. The reference numerals in the patent claims are not meant to be limiting but merely serve to improve readability of the claims.

According to one aspect of the invention, the problem is solved by a component for an electrical connector with the features of claim 1. The component for an electrical connector comprises a housing and a plurality of electrical contact elements, the ends of which are accessible at one end of the housing for connection to a mating connector component, wherein the electrical contact elements are arranged in at least two segments which are separated from and shielded against each other. The outer contour of each of the at least two segments has at least two legs and a base side extending from one end of one leg to one end of the other leg, at least one leg of each segment forming an interior angle of 30° to 80° or 100° to 150° with the base side. The at least two segments are arranged in a row with a shielding being provided between the legs of neighbouring segments.

According to another aspect of the invention, the problem is solved by a component for an electrical connector with the features of claim 6. The component for an electrical connector comprises a housing and a plurality of electrical contact elements, the ends of which are accessible at one end of the housing for connection to a mating connector component, wherein the electrical contact elements are arranged in at least two segments, preferably at least three segments, which are separate from and shielded against each other. The outer contour of each of the at least two segments has at least two legs and a base side extending from one end of one leg to one end of the other leg, the legs forming an interior angle of 20° to 150° at the end opposite the base side. The at least two segments are arranged around a common centre point lying outside the segments, the base sides of the segments facing outwards away from the centre point. This embodiment is especially well suited for components and connectors with a circular or ellipsoidal connector face. The angle between the legs of the outer contour of the segments can be adjusted to the number of segments required and the installation space available.

In the context of the present invention, a "component" of an electrical connector is a device that can mate with a mating component, also of the electrical connector, to achieve an electrical connection between electrical contact elements of the component and corresponding mating electrical contact elements of the mating component. The invention also encompasses embodiments in which in addition to the electrical contacts the electrical connector also comprises terminals for the transfer of light and/or fluids, including liquids such as cooling liquids and gases such as air, from the component to the mating component. In the context of the present invention, "segments" each encompass a plurality of electrical contact elements. Depending on the number of elements and their arrangement inside the segment, the outer contour of the segment may have different forms. A form according to the invention which is non-square and non-circular provides a large flexibility of design for the arrangement of electrical contact elements inside the segments on the one hand, but also for the arrangement of segment in relation to each other.

Two segments being "shielded" against each other means that a shielding is provided between these segments. A "shielding" in the context of the present invention is a barrier for at least partly blocking an electromagnetic field. It is an achievable advantage of the shielding that a coupling or interference of radio waves, electromagnetic fields, and or electrostatic fields inside the segment to/with those inside the neighbouring segment can be reduced or avoided.

Advantageously, with the combination of the arrangement of electrical contact elements in at least two segments and the outer contour of the segments according to the invention an electrical connector can be created that is able to transmit several data protocols, electrical signals and/or energy in a single connector without disturbances in a compact design. Particularly advantageously, due to the non-orthogonal interior angles, it is achievable that the contact element within a segment can be packed more densely, the number of contact elements in the segment can be maximised and/or the spacing between the contact elements can be optimised.

According to a further aspect of the invention, the problem is solved by an electrical connector comprising a component according to the invention. All aspects of the present invention also encompass embodiments that in addition to the segments according to the invention comprise further contact elements or arrangements of contact elements that may or may not be shielded.

PREFERRED EMBODIMENTS OF THE INVENTION

Preferred features of the invention which may be applied alone or in combination are discussed in the following and in the dependent claims.

A component according to the invention comprises a plurality of electrical contact elements that are arranged in at least two segments. The component may comprise more than two segments with equal or unequal numbers of electrical contact elements. Additional segments may comprise just one element for example, depending on the energy, signal and/or data protocols to be transmitted by the element. In some embodiments of the invention, all contact elements within one or all segment(s), are of identical design. However, the invention also includes embodiments in which contact elements between segments or even within the same segment are of non-uniform design, ie, they differ in design.

The electrical contact elements may have any form suitable for the transmission of electrical signals, data protocols and/or energy known in the art, for example pins including pogo pins, sleeves including lamella sleeves, pressure spring contacts or contact fields. They may be arranged in pairs or alone, for example in the case of a coaxial element. The elements in one segment may be of the same type or of different types, depending on the energy, signal and/or data protocols to be transmitted by the elements.

The electrical contact elements may be configured to transmit energy, signals and/or any data protocols known in the art, for example a HDMI video protocol, a MIPI video protocol, a DisplayPort video protocol, Firewire, eSata, DVI, PCIE, USB or Ethernet protocols. They may be configured to transmit one protocol in a segment, to transmit more than one protocol in the same segment, to split one protocol between several segments or any possible combination of the aforementioned options. Suitable pin configurations may also comprise contact elements that are connected to ground or that are not connected at all.

In some embodiments, the outer contour of at least one of the segments—preferably two, more preferably all segments—is or are generally triangular, for example generally isosceles-triangular. In this case, the contour of the at least one segment comprises two legs and one base. In some embodiments, the outer contour of at least one of the segments—preferably two, more preferably all segments—is or are generally trapezoidal, modifiedly trapezoidal, parallelogram-shaped or modifiedly parallelogram-shaped; the shape may be isosceles. In these cases, the contour of the at least one segment comprises two legs, a base and another side that, preferably, extends essentially in parallel to the base. If the component is elongate, the bases of the segments preferably extend in the longitudinal direction of the component.

In the context of the present invention, "generally" triangular, trapezoidal, modifiedly trapezoidal, parallelogram-shaped or modifiedly parallelogram-shaped means that the corners of the contour may be rounded, chamfered or otherwise deviate from the form of an exact shape of the afore-mentioned kinds. "Modifiedly" trapezoidal and parallelogram-shaped means that the legs of the contour are, while being at a non-orthogonal angle relatively to the base, are not parallel to each other. Furthermore, "modifiedly" triangular, trapezoidal and parallelogram-shaped includes, that at least one side, more sides or all sides can be curved, preferably only slightly curved. For those embodiments, angles can be measured in relation to the chord.

In each segment, at least one leg, preferably both legs, form an interior angle with the base side of either between 30° and 80°, more preferably between 400 and 75°, even more preferably between 50° and 70°, for example approximately 60°, or between 100° and 150°, more preferably between 115° and 140°, even more preferably between 110° and 130°, for example approximately 120°. If the outer contour of a segment is generally triangular, generally trapezoidal or generally modifiedly trapezoidal, the legs preferably form an interior angle of 20° to 120°, more preferably of 30° to 110°, more preferably of 40° to 100°, for example approximately 60° to each other.

In a preferred embodiment of the component with segments arranged in a row, the segments are arranged in at least two parallel rows. The component may comprise further rows in parallel or single elements, depending on the requirements of energy, signal and/or data transmission and installation space available. The invention also includes embodiments in which one or more of the segments spans two or more rows. Preferably, the at least one, preferably all segments in one row at its or their base adjoin a segment in another row. Preferably, a shielding is provided between segments of different rows.

It is further preferred for these embodiments that neighbouring segments in a row are arranged alternately with regard to their orientation. As an example, neighbouring segments may be arranged offset by about 180°, meaning that the base sides of neighbouring segments alternate between the upper side and the lower side of a row.

These embodiments are especially well suited for flat elongated components of connectors. The form of the outer contour of the segments combined with the alternating orientation of the segments in a row allows a compact design of components for electrical connectors.

The electrical contact elements can be arranged in a segment in any number and order that are suitable to transmit desired data protocols, other electrical signals and/ or energy.

In a preferred embodiment of the component according to the invention, the segments each have at least three electrical contact elements, more preferably at least four, more preferably at least six, more preferably at least eight electrical contact elements, in particular at least sixteen electrical contact elements.

Preferably, the at least some—preferably the majority, more preferably all—electrical contact elements of each of the segments are positioned—at least approximately—on grid points of a triangular grid, more preferably a hexagonal grid. In the context of the present invention, a "hexagonal grid" is to be understood as a grid that is non-orthogonal and non-circular, similar to grids that are known from a close-packing of equal spheres. More preferably, the grid is non-orthogonal and non-circular with regard to the direction of the base. "Grid points" are to be understood as points of intersection of the grid. With respect to the arrangement of the contact surfaces on the grid points, the term "approximately" means that the contact surfaces do not have to be positioned exactly on the grid points in a strictly mathematical sense. They may deviate from the mathematical grid points as long as they do not form an arrangement that corresponds to an essentially orthogonal grid. Arranging the contact surfaces exactly or approximately on grid points of a triangular or hexagonal grid can have the advantage that more electrical contact elements can be positioned in a segment than by a orthogonal or circular design without compromising on the distance between the elements.

Depending on the requirements, at least some—preferably the majority, more preferably all—of the elements in a segment may be arranged on a sparse hexagonal grid in the sense that not all grid points are occupied by elements. Combinations of hexagonal arrangements and other geometric or arbitrary arrangements are encompassed by the invention. For example, a segment with several electrical contact elements arranged approximately on grid points of a hexagonal grid may have a further element that is positioned outside the grid, e.g. a coaxial element positioned in the angle opposite the base side of the segment.

In a preferred embodiment the at least three electrical contact elements are arranged such that for at least one, preferably the majority, more preferably all elements the smallest angle between vectors extending to the two closest neighbouring elements is less than 80°, preferably less than 70°, for example approximately 60°. In a preferred embodiment with at least three electrical contact elements in a segment the elements are arranged such that for at least one, preferably the majority, more preferably all elements the second-closest element is less than 1.4, preferably less than 1.3, more preferably less than 1.2, for example approximately less than 1.1 times as far apart as the closest element.

In a preferred embodiment of the component according to the invention, the free distance between closest adjacent electrical contact elements, for example contact pins or contact sleeves, in a segment is smaller than twice, more preferably smaller than 1.5 times, even more preferably smaller than 1.2 times the outer diameter of the electrical contact elements. The outer diameter is measured in a plane perpendicular to the mating direction. Preferably, the free distance between closest adjacent electrical contact elements in a segment is larger than 0.2 times, more preferably larger than 0.5 times, even more preferably larger than 0.7 times the outer diameter of the electrical contact elements. This ratio provides a good compromise between a large number or elements in the available segment area and a distance large enough to avoid interferences or other disturbances in signal transmission.

In a further preferred embodiment the outer diameter of the contact element is larger than 0.3 mm, more preferably lager than 0.5 mm or even more preferably lager or equal to 0.6 mm. Preferably the outer diameter of the contact element is smaller than 2 mm, more preferably smaller than 1.5 mm or even more preferably smaller than 1 mm. Preferably the free distance between closest adjacent contacts is larger than 0.2 mm, more preferably lager than 0.3 mm and even more preferably lager than 0.4 mm. Preferably the free distance between closest adjacent contacts is smaller than 1.5 mm, more preferably smaller than 1.2 mm and even more preferably smaller than 1 mm.

It is further preferred that the outer contour of the segments corresponds to the envelope around the electrical contact elements arranged in the segment. An outer contour according to this embodiment minimizes the space needed for the realization of the desired energy, signal and/or data protocol transmission and fosters a compact and minimalistic design of electrical connectors.

The segments in a component may be of the same shape or of different shapes, for example a first segment with an outer contour in the shape of a trapezium and a neighbouring second segment with an outer contour in the shape of a triangle. These contours are especially well suited for a compact arrangement of segments and thus a minimalistic design of an electrical connector.

A component according to the invention may also comprise additional contact elements or arrangements of contact elements that do not have a contour according to the present invention. Such segments may, for example, be a circular segments which contain elements for coaxial connections, or a rectangular segment. Combined with at least two segments with an inventive form, this arrangement still needs less installation space than connectors known in the art.

Advantageously, the outer shape of the face of the housing around the segments corresponds to the envelope around all segments which allows a compact design of the component or connector. In a further preferred embodiment the number of segments in a row is odd, for example 3, 5, 7, 9 or 11. Preferably, the outer shape of the face of the housing corresponds to the envelope around all segments. Preferably, the form of the outer contour of the segments the outer shape of the face of the housing has a form other than rectangular, and particularly preferably it is not rotationally symmetrical with regard to an angle of 180°, as would be a parallelogram for example. Thus, from the outer shape of the housing alone the orientation how to plug a connector into a mating socket connector is given. It is not possible to plug the connector in the wrong orientation in this case.

The component according to the invention may comprise segments that represent a plug, a socket or a combination of plugs and sockets. The elements in a segment may also be of plug type, the socket type or combinations thereof. In a preferred embodiment the component is a plug, a socket or a combination of plug and/or socket. It is further preferred that the electrical connector comprising at least one component according to the invention is a plug, a socket or a combination of plug and/or socket.

According to the invention, the at least two segments are shielded against each other. Shielding can be provided by any means known in the art that are suitable to fulfil the requirements on shielding with regard to the respective energy, signals and/or data protocols that are to be transmitted by the contact elements in the segments. In preferred variants, shielding is provided by conductive metal sheets, lamellae, meshes, grids or foams between neighbouring segments. Preferably, the shielding extends along at least part of the length of the boundary that separates the two neighbouring segments, more preferably along substantially the entire length of the boundary that separates two neighbouring segments which are shielded against each other. Moreover, the preferred shielding extends in a direction perpendicularly to the connector face of the component and/or in a mating direction of the component.

In a preferred connector according to the invention, when the component and the mating component are mated, in at least one, preferably all, segment(s) the shielding of the component and the mating component complement each other. In this context, "complement" means that at least in one location between adjoining segments where the component provides no shielding, the mating component provides shielding or vice versa. For example, if the shielding in one of the component and the mating component has a gap at a location along the boundary between neighbouring segments, the other of the component and the mating component provides a shielding in this location to close the gap. Alternatively, or in addition, the shielding of one of the component and the mating component may extend by a first amount perpendicularly to the connector face or in the mating direction, and the shielding of the other of the component and the mating component may extend by a second amount likewise perpendicularly to the connector face or in the mating direction, so that the shieldings of the component and the mating component combined extends by a larger amount than the first and the second amount perpendicularly to the connector face or in the mating direction. In this case, preferably the shieldings of the component and the mating component abut against each other at their leading edges in their respective mating direction.

In some embodiments of the invention, the segments are individual elements, for example inserts, that are assembled to form the component according to the invention. Particularly preferably, in such embodiments the elements are modular such that segments can be assembled in multiple configurations. In other embodiments of the invention, the segments constitute a single element.

The preferred shielding is effective in at least partly blocking electromagnetic radiation, particularly preferably high frequency (HF) electromagnetic radiation. The preferred shielding between two segments of the component can reduce or prevent interference between signals such as HDMI video signals, MIPI video signals, DisplayPort video signals, Firewire, eSata, DVI PCIE signals, USB or Ethernet signals transferred in the first of these two segments of the component and signals of one of the afore-mentioned kinds, in any combination, transferred in the second of these two segments.

It is further preferred that the housing is also shielded against its external environment, such that the segments are shielded against each other and against the environment. In a preferred embodiment the housing encloses the segments and is made of an electrically conductive material, preferably a metal. Advantageously, the housing encloses the segments not only in the circumferential direction around all segments, but also encloses single segments, for example by webs extending from one side of the housing to the other side and forming cavities for the segments. In the assembled state, the webs spatially separate and shield neighbouring segments between their respective legs. For embodiments with segments arranged in two or more rows, shielding is preferably also provided between the rows, for example by webs of the housing that extend from one end of the housing to the other end of the housing. Preferably, the shielding parts of the housing are grounded.

Shielding around and between segments in the housing can be realized in different ways. In one variant the housing is fabricated monolithically, for example machined from a solid material, cast or produced by additive manufacturing methods. In another variant the housing and the shielding components, for example webs, are produced as separate parts and are subsequently joined together, for example welded, soldered, glued or mechanically fitted, e.g. press-fitted.

For embodiments with more than two segments, not all of the segments have to be shielded against each other, depending on the requirements for energy, signal and/or data protocol transmission.

It is further preferred that the shielding between segments is realized in a mechanically stable way. One example are webs of the housing between adjacent segments. Preferably those webs extend in the direction of the connector face and encompass the electrically contact elements of one or more segments at least partially in the direction of the connector face. Apart from the shielding effect, this embodiment has the advantage that the electrical contact elements in the segments are protected against mechanical wear or deformation.

It is an advantage of the shielding between the segments according to the invention that sufficient and reliable shielding against electromagnetic disturbances or interferences is provided in a compact design of the component.

BRIEF DESCRIPTION OF THE DRAWINGS

In the following, further preferred embodiments of invention are illustrated by means of examples. The invention is not limited to these examples, however.

The drawings schematically show.

DETAILED DESCRIPTION OF AN EMBODIMENT OF THE INVENTION

Figure 1:
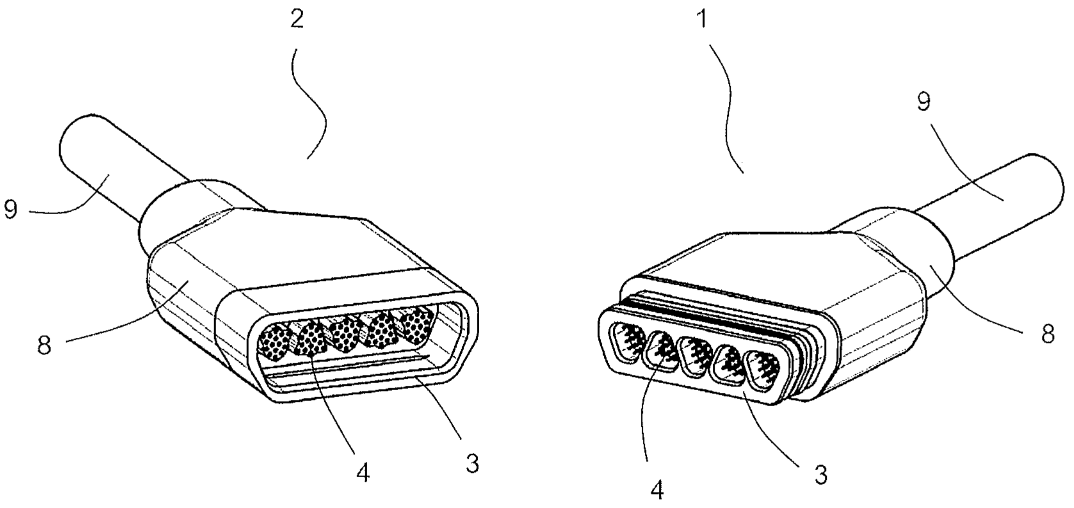
FIG. 1 A perspective view of a connector comprising a connector component (right) and a mating connector component (left)

In the following description of preferred embodiments of the invention, identical reference numerals refer to identical or similar components.

Figure 2:
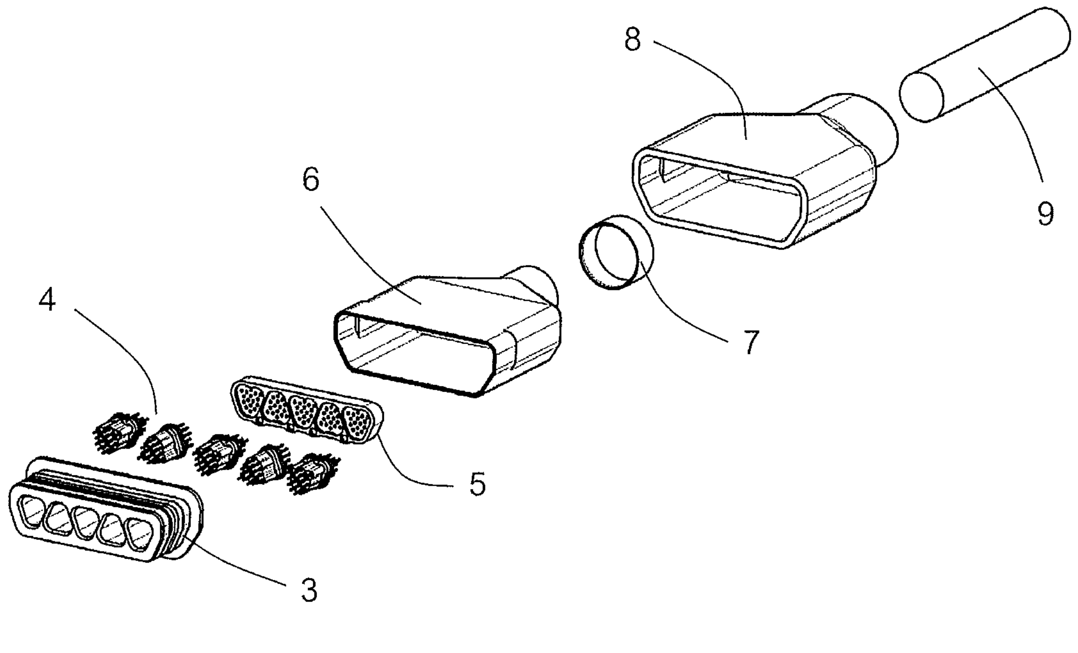
FIG. 2 An exploded view of the connector component according to FIG. 1.
Figure 3:
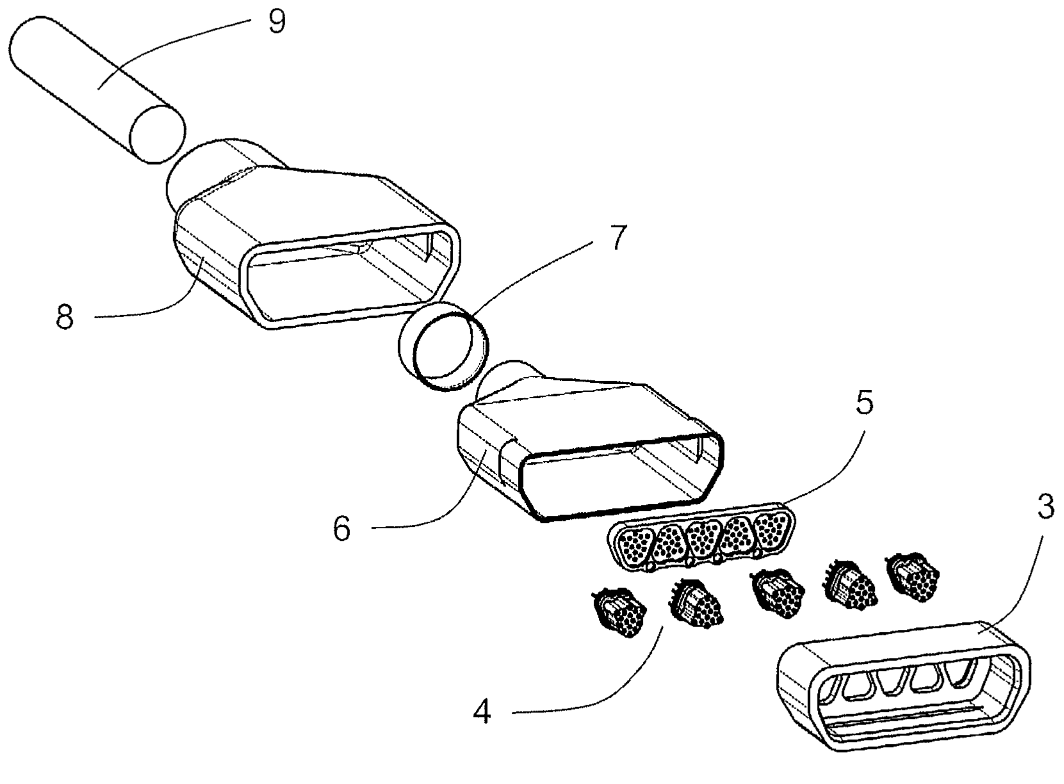
FIG. 3 An exploded view of the mating connector component according to FIG. 1.

FIG. 1 shows a perspective view of a connector comprising a connector component 1 (right) in the form of a plug and a mating connector component 2 (left) in the form of a mating socket. The connector component 1 is hereafter also termed "connector plug", whereas the mating connector component 2 is hereafter termed "connector socket". FIGS. 2 and 3 show an exploded view of the connector plug 1 and of the mating connector socket 2, respectively.

The connector plug 1 shown in FIGS. 1 and 2 comprises a front housing 3 with five apertures in the form of isosceles trapezia with rounded corners in the connector face. The apertures are arranged in a row, adjacent apertures being rotated by 180°. The outer shape of the face of the housing 3, ie the connector face, corresponds to the envelope around all apertures and forms a isosceles trapezoid with rounded corners.

Five segments 4 with electrical contact elements 10 are provided as inserts that are immobilised and sealed by means of potting 5. The segments 4 are enclosed by the front housing 3 in the mounted state of the connector. The ends of the electrical contact elements 10 are accessible through the apertures for connection to a mating connector component 2. The apertures of the front housing 3 are separated by webs that are grounded and serve as shields against electromagnetic or other interferences. Thus, the five segments 4 are spatially separated from each other and shielded against each other. While in the figures, the webs extend along the entire length of the legs, thereby entirely separating the segments, in an alternative embodiment the webs may be interrupted.

A cable 9 is connected to the connector component 1, enclosed by a back shell 6 and fixed with a crimp sleeve 7 on the back shell 6. A back housing 8 is attached, by overmoulding, to the front housing 3 and encloses the backshell 6, crimp sleeve 7, potting 5 and the segments 4 with electrical contact elements 10.

The socket connector component 2 shown in FIGS. 1 and 3 comprises a front housing 3 with five apertures in the form of isosceles trapezia with rounded corners. The apertures are arranged in a row, adjacent apertures being rotated by 180°. The apertures are arranged on the back side of the front housing 3, the connector face being one large opening comprising all apertures and being able to receive a mating plug connector 1. The outer shape of the face of the housing 3, ie, the connector face, corresponds to the envelope around all apertures and forms a isosceles trapezoid with rounded corners.

Five segments 4 with electrical contact elements are provided as inserts that are immobilised and sealed by means of potting 5. The segments 4 are enclosed by the front housing 3 in the mounted state of the connector. The ends of the electrical contact elements are accessible through the apertures for connection to a mating connector. The apertures of the front housing 3 are separated by webs that are grounded and serve as shields against electromagnetic or other interferences. Thus, the five inserts 4 are spatially separated from each other and shielded against each other. Again, while in the figures, the webs extend along the entire length of the legs, thereby entirely separating the segments, in an alternative embodiment the webs may be interrupted.

When the connector component 1 and the mating connector component 2 are mated, their shieldings abut against each other at their leading edges in their respective mating direction, so that in combination the shieldings shield the mated connector elements 10 along their entire length.

A cable 9 is connected to the mating connector component, enclosed by a backshell 6 and fixed with a crimp sleeve 7 on the back shell 6. A back housing 8 is attached to the front housing 3 and encloses the back shell 6, crimp sleeve 7, potting 5 and the segments 4 with electrical contact elements 10.

Figure 4:
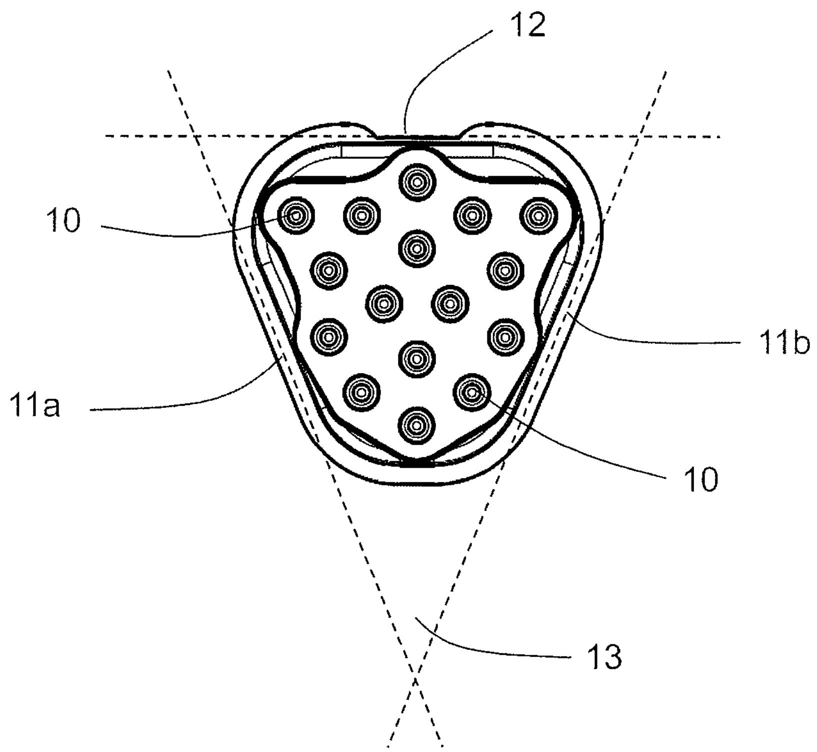
FIG. 4 A segment with electrical contact elements.

FIG. 4 shows a segment 4 with sixteen electrical contact elements 10 in a front view. The elements 10 may be male pins for a plug connector or female pins for a socket connector for example. The contact surfaces of the elements 10 are arranged in such a way that they lie approximately on grid points of a hexagonal grid. In the example shown in FIG. 4 the elements 10 are arranged symmetrically to a longitudinal vertical axis in the middle of the segment. From the bottom to the top the elements 10 are arranged in three groups. The first group comprises four elements 10 two of which are located above each other on the axis of symmetry. One further element 10 is located to the left and to the right of the axis in between the vertical space between the two elements on the axis. The second group comprises six elements 10 none of which is located on the axis of symmetry. One element 10 is located to the left and to the right of the axis and two further elements 10 are located further to the left and to the right, respectively. In the vertical direction they are located above and below the two inner elements 10 such that they are located in the vertical space between the two outer elements 10 each. The third group comprises six elements two of which are located above each other on the axis of symmetry. Two further elements are located to the left and to the right of the axis in between the vertical space between the two elements on the axis. The distance between adjacent electrical contact elements 10 in the segment corresponds to about 0.8 times the outer diameter of the electrical contact elements 10.

The outer contour of the segment corresponds to the envelope around the electrical contact elements 10 arranged in the segment and has approximately the shape of a trapezium with rounded corners. It has two legs 11*a*, 11*b* and a base side 12 extending from one end of one leg 11*a* to one end of the other leg 11*b*. The legs 11 and the base side 12 are indicated in FIG. 4 by dashed lines. The legs 11*a* and 11*b* form an angle 13 of 45° at the end opposite the base side 12.

Figure 5:
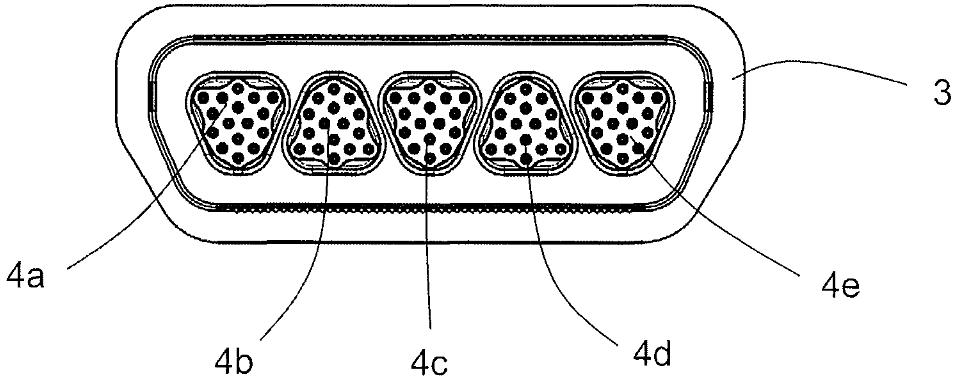
FIG. 5 A front view of the connector face of the connector component according to FIG. 2 with five segments according to FIG. 4.

FIG. 5 shows a front view of the connector face of the connector component according to FIG. 2 with five segments according to FIG. 4 embedded in the front housing 3. The five segments 4*a* to 4*e* are identical with respect to their number of electrical contact elements and their arrangement in the segments. The segments are arranged in a row, adjacent segments 4*a*/4*b*, 4*b*/4*c*, 4*c*/4*d* and 4*d*/4*e* being offset by 180°. The segments adjoin one another at their legs with webs of the front housing 3 between each pair of adjacent legs serving as a shield against interferences.

The combination of the outer contour and arrangement of the segments and the shielding between the segments provides a component for an electrical connector that enables the transmission of several data protocols, electrical signals and/or energy in a single connector without disturbances or interferences in a compact design.

Figure 6:
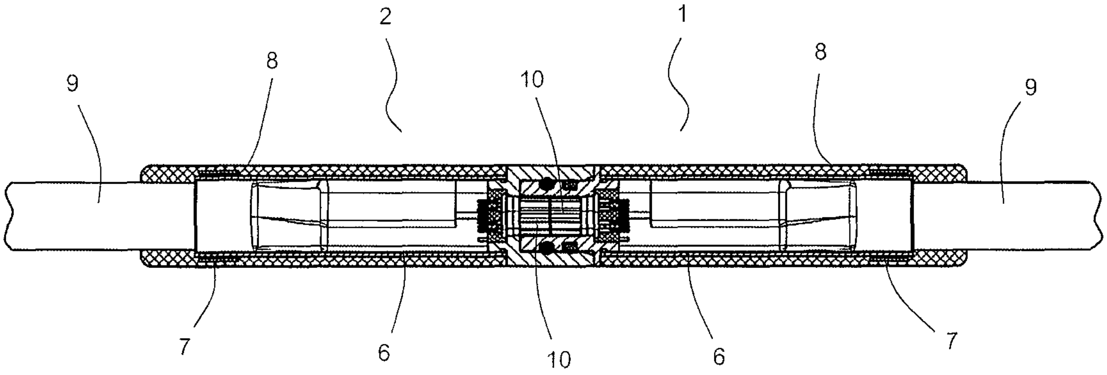
FIG. 6 A cross-sectional view of connected connector component and mating connector component according to FIG. 1.
Figure 7:
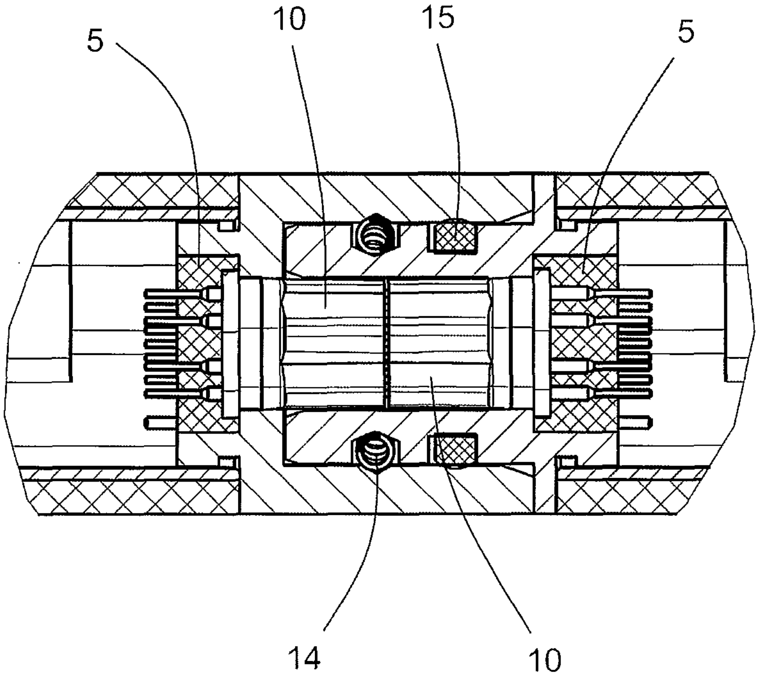
FIG. 7 A detail of FIG. 6.

FIG. 6 shows a cross-sectional view of the plug connector 1 and the socket connector 2 in the connected state. FIG. 7 shows the connection of the connector faces in more detail. The plug connector 1 is completely inserted into the socket connector 2. The plug connector comprises two circumferential grooves. In one of the grooves a coil spring 14 is arranged. The other groove contains a ring seal 15. The socket connector 2 comprises a circumferential recess for the engagement with the coil spring. The coil spring 14 fixes the position of the plug connector 1 inside the socket connector 2 and prevents it from slipping out unintentionally and serves as a shielding contact. The seal 15 prevents water, dust or other dirt from entering the inner parts of the front housing 3 and thus the electrical contact elements 10.

Figure 8:
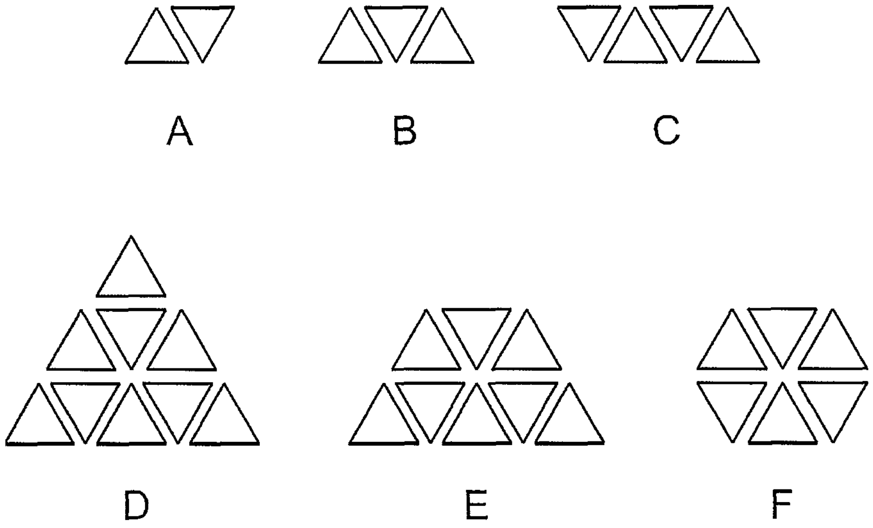
FIG. 8 A schematic diagram of exemplified arrangements of segments.

FIG. 8 shows schematic diagrams of exemplified arrangements of segments in a front view. In examples A, B and C the segments are arranged in one row and adjacent segments are set off by 180°. In examples E and F the segments are arranged in two parallel rows and in example D a further segment is added as a third row above the two rows according to example E. In all cases, adjacent segments in a row are arranged rotated by 180°.

Figure 9:
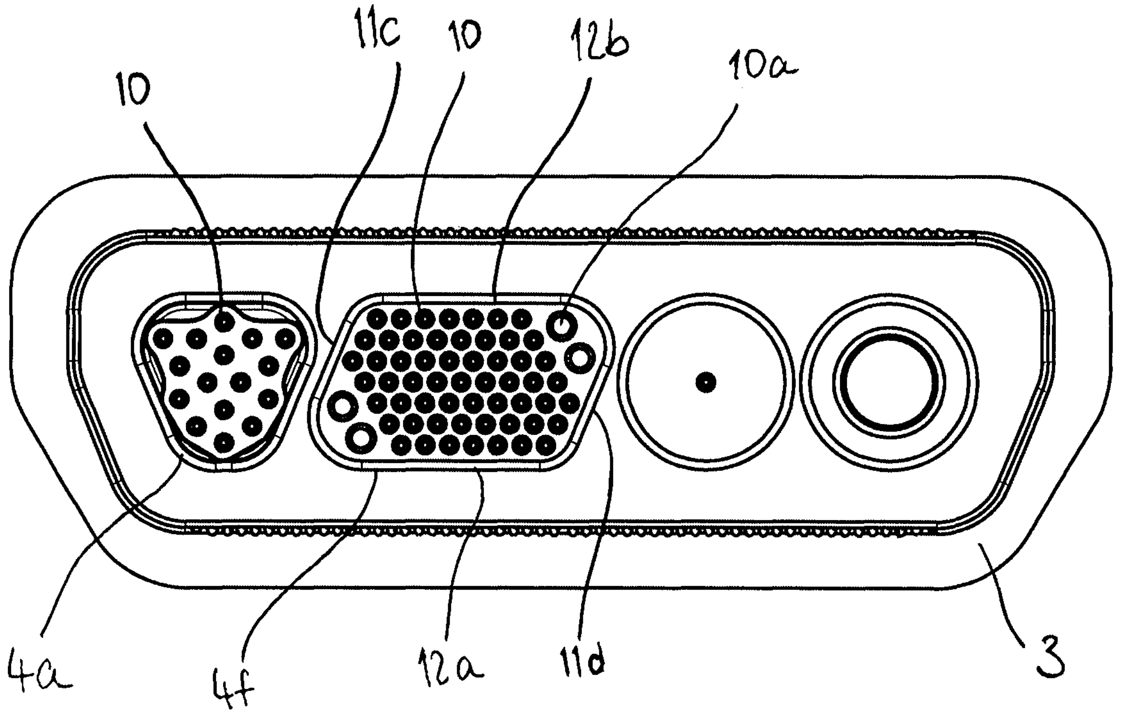
FIG. 9 A front view of the connector face of an alternative connector component.

Another connector component is shown in FIG. 9. From left to right, it comprises a first generally trapezoidal segment 4*a* that is identical to the segment 4*a* shown in FIG. 4, and a second segment 4*f* that is generally parallelogram-shaped. The second segment 4*f* has 71 identical signal contacts 10 arranged in essentially a hexagonal lattice and four further, larger contacts 10*a*, two in each far corner of the second segment 4*f*. On the right of the second segment 4*f*, there is a coaxial connector and even further right there is a terminal for the supply of compressed air. The outer contour of the second segment 4*f* corresponds to the envelope around the electrical contact elements 10, 10*a* arranged in the second segment 4*f* and has approximately the shape of a parallelogram with rounded corners. It has two legs 11*c*, 11*d* and, a base side 12*a* and a another side 12*b* parallel to the base side 12*a*, each extending from one end of one leg 11*c* to one end of the other leg 11*d*. The legs 11*c*, 11*d* form an angle of 45° and 135°, respectively, with the base side 12*a*.

The above examples can be combined in any configuration and combined with any additional elements or features. The invention is not restricted to the design shown in the example above. Further embodiments of the component and connector according to the invention include, for example, combinations of plugs and plugs, plugs and sockets, sockets and sockets. Apart from the example that demonstrates a cable-to-cable assembly, other designs are also possible, for example cable-to-device assemblies or device-to-device assemblies. The geometric design is also not restricted to the connectors shown in the example. For example, designs are possible where the cable axis and the axis perpendicular to the connector face form an angle other than 180°, e.g. 45° or 90°. A further example is a housing with a plug connector at one end and a socket connector at the other end where the housing has a right-angled form in the sense that the axes perpendicular to the respective end faces have an angle of 90°.

The features as described in the above description, claims and figures can be relevant individually or in any combination to realise the various embodiments of the invention.

REFERENCE NUMERALS

1 . . . connector component
2 . . . mating connector component
3 . . . front housing
4 . . . insert, segment
5 . . . potting
6 . . . backshell
7 . . . crimp sleeve
8 . . . overmoulding
9 . . . cable
10 . . . electrical contact element
11 . . . leg
12 . . . base side
13 . . . angle between legs
14 . . . coil spring
15 . . . seal

What is claimed is:

1. A component for an electrical connector, comprising a housing and a plurality of electrical contact elements, the ends of which are accessible at one end of the housing for connection to a mating connector component, wherein the electrical contact elements are arranged in at least two segments which are separated from and shielded against each other, wherein the outer contour of each of the at least two segments has at least two legs and a base side extending from one end of one leg to one end of the other leg, at least one leg of each segment forming an interior angle of 30° to 80° or 100° to 150° with the base side, and the segments are arranged in a row with a shielding being provided between the legs of neighbouring segments.

2. The component according to claim 1, wherein the outer contour of at least one of the segments is generally triangular.

3. The component according to claim 1, wherein the outer contour of at least one segment is generally trapezoidal, generally trapezoidal with at least one side of the outer contour being curved, generally parallelogram-shaped or generally parallelogram-shaped with at least one side of the outer contour being curved or the legs not being parallel.

4. The component according to claim 1, wherein the segments are arranged in at least two parallel rows.

5. The component according to claim 1, wherein neighbouring segments in a row are arranged alternately with regard to their orientation.

6. A component for an electrical connector, comprising a housing and a plurality of electrical contact elements, the ends of which are accessible at one end of the housing for connection to a mating connector component, wherein the electrical contact elements are arranged in at least two segments which are separate from and shielded against each other, wherein the outer contour of each of the at least two segments has at least two legs and a base side extending from one end of one leg to one end of the other leg, the legs forming an interior angle of 20° to 150° at the end opposite the base side, wherein the segments are arranged around a common centre point lying outside the segments, the base sides of the segments facing outwards away from the centre point, wherein each of the at least two segments has at least three contact elements which are arranged such that for at least one element in each segment the smallest angle between vectors extending to the two closest neighboring elements is less than 80°.

7. The component according to claim 6, wherein the outer contour of at least one segment is generally triangular, generally trapezoidal or generally trapezoidal with at least one side of the outer contour being curved.

8. The component according to claim 1 or 6, wherein the segments each have at least three electrical contact elements, which are positioned approximately on grid points of a triangular grid.

9. The component according to claim 1 or 6, wherein the distance between closest adjacent electrical contact elements in a segment corresponds to between 0.2 times and 2 times the outer diameter of the electrical contact elements.

10. The component according to claim 1 or 6, wherein the outer contour of the segments corresponds to the envelope around the electrical contact elements arranged in the segment.

11. The component according to claim 1 or 6, wherein the outer contour of the segments are identical.

12. The component according to claim 1 or 6, wherein the number of segments is odd, and the outer shape of the face of the housing corresponds to the envelope around all segments.

13. The component according to claim 1 or 6, wherein the component is a plug, a socket or a combination of plug and/or socket.

14. An electrical connector comprising a component according to claim 1 or 6 and a mating connector component.

* * * * *